Feb. 10, 1959 D. D. MURPHY 2,873,022
SELF-ALIGNING BELT IDLER
Filed May 21, 1954
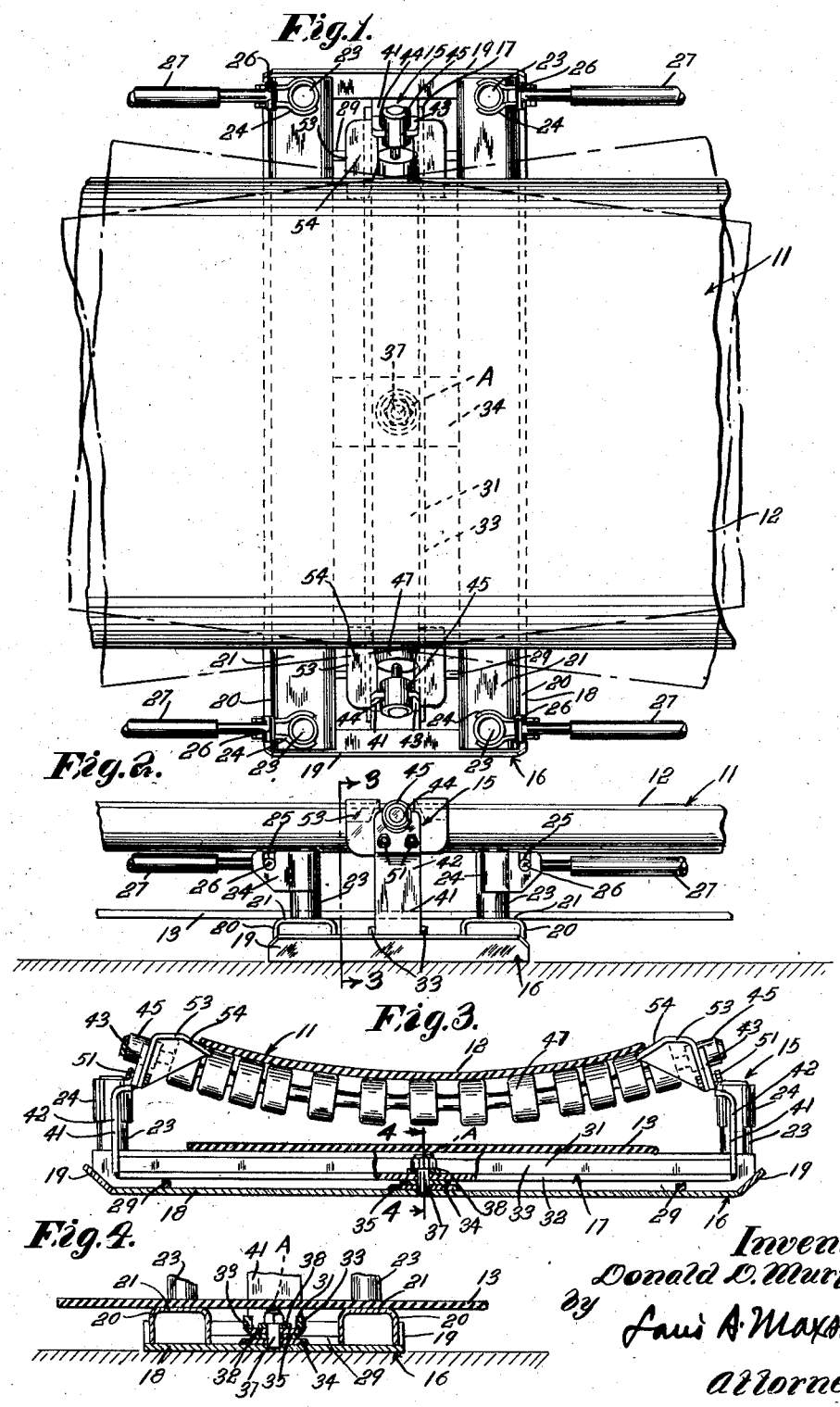
Inventor:
Donald D. Murphy.
by Lewis A. Maxson.
Attorney.

United States Patent Office 2,873,022
Patented Feb. 10, 1959

2,873,022

SELF-ALIGNING BELT IDLER

Donald D. Murphy, New Philadelphia, Ohio, assignor to Joy Manufacturing Company, Pittsburgh, Pa., a corporation of Pennsylvania Application May 21, 1954, Serial No. 431,414

10 Claims. (Cl. 198—202)

This invention relates to self-aligning belt idlers.

An object of the invention is to provide an improved, simple but effective, self-aligning belt idler of very low height which provides a pivoted supporting frame having idler means to support and guide the upper run of a conveyor belt and which is automatically operable to swing about its pivot in response to any material movement of the upper run of the belt from its normal position and to cause the belt to return to its normal position. Another object is to provide an improvel belt idler arrangement providing a self-aligning belt supporting and guiding means for the upper run of a conveyor belt and associated means for guiding and supporting the return run of the belt, all in a vertically very compact arrangement. Still another object of the invention, from another aspect, is to provide a self-aligning belt idler having an improved arrangement, including friction actuating shoes, whereby the belt itself, as it moves out of central position exerts forces on the pivoted supporting frame to effect such movements of the latter as will effect belt return to mid-position. Other objects and advantages of the invention will hereinafter appear.

A preferred embodiment of the invention from its main aspect will hereinafter be noted to comprise a base supporting a vertically pivoted frame which supports a guiding and supporting idler roller arrangement for the active run of a belt, said frame providing, below said guiding and supporting idler roller arrangement and above its own vertical pivot, space for traverse by the return run of the belt. The return run of the belt will desirably be provided with support by spaced guide frame portions on the base, and the pivot of the vertically pivoted frame will be located between said guide frame portions and below the tops of the latter. The guide frame portions will desirably be provided with spaced upstanding post-like portions by means of which lateral shifting of the return run of the belt will be limited, and the vertically pivoted frame will have upstanding brackets at its ends for supporting idler roller means upon which the active run of the belt will rest, and said brackets will be so spaced that even in angled relation of the vertically pivoted frame there will be no engagement by the edges of the lower, return run of the belt with said brackets, but rather with said post-like elements. From the aspect of the improved arrangement including friction actuating shoes whereby the belt itself as it moves out of central position exerts forces on the pivoted supporting frame to effect such movements of the latter as will affect belt return to mid-position, the pivoted supporting frame may desirably have fixedly secured thereto friction actuating shoes providing, for engagement by the belt as the latter is laterally displaced, sloping surfaces, preferably a pair at each end of the frame, said friction actuating shoes disposed alongside the end rollers of the idler roller arrangement and having their free ends underlying the lateral edges of the belt when the latter is in central position and having their sloping surfaces above mentioned inclined upwardly and outwardly more steeply than are the axes of the end rollers beside which they are disposed, whereby the belt does not have to move even to the outer end of an idler roller which supports its edge before operative contact is established with at least one friction actuating shoe. Other desirable features will appear from the detailed description of the illustrative embodiment which will shortly be given.

In the accompanying drawings in which one illustrative form which the invention may assume in practice is shown:

Fig. 1 is a top view of a portion of a conveyor belt in association with an illustrative embodiment of the improved self-aligning belt idler arrangement;

Fig. 2 is a side elevational view of the structure shown in Figure 1;

Fig. 3 is a transverse vertical section on the plane of the line 3—3 of Fig. 2; and Fig. 4 is a fragmentary, cross-sectional view on the plane of the line 4—4 of Fig. 3.

Referring to the drawing, it will be noted that a conveyor belt 11 is shown as having an active upper run 12 and a lower return run 13. At appropriately spaced positions along the belt there are provided the low height, reversible, self-training idlers 15 which incorporate the present invention, and one of them is shown in the drawing. This includes a base structure 16 and an upper structure 17, the upper structure swivelly supported on the base structure for turning relative to the latter on a vertical axis indicated at A.

The base structure 16 comprises a bottom or skid plate 18 having upturned ends 19. Secured to the top of the plate 18, one at each side of the central transverse line (transverse to the belt) of this plate, are inverted trough shaped members 20, each of which provides a top surface 21 which the return run 13 of the belt 11 engages and by which the return run is slidingly supported. Supported on the outer ends of the members 20 are upstanding elements or posts 23 to which there are suitably secured, as by welding, support brackets 24. These extend away from each other in mutually opposite directions, and each is as shown slotted as at 25 for the reception of a T-shaped head 26 on a connecting and spacing rod element 27, these elements maintaining mutually adjacent base structures properly spaced and connected. The plates 18 have secured to them near their opposite ends and extending crosswise thereof, i. e. transversely to their major dimension, support and guide elements 29 which are adapted to prevent excessive tilting of the swiveled upper structure when a heavy, somewhat off-center load is being carried on the upper run 12 of the conveyor belt 11.

Turning now to the swiveled upper structure 17, it will be noted that it includes a channel shaped support element 31, shown, for convenience of manufacture, of a built up construction, of which support element the bottom element 32 has welded to it side elements 33. A low support element 34, shown as welded to the top of the base 18, supports a bearing washer 35 which underlies the support element 31 at its mid-point, and a bearing stud 37 fixed to the base structure 16 provides a pivot for the support element, which is held against separation from the base structure by an overlying washer 38 and a nut threadedly engaged with the upper end of the stud 37. As previously noted, tilting of the support element is limited by engagement of its lower side with the stop members 29.

The channel shaped support element 31 has suitably secured to its opposite ends, as by welding, upstanding support or bracket elements 41, each comprising, as shown, a relatively vertical portion 42 and an inclined portion 43. The inclined portions incline upwardly towards each other and are provided with slots 44 for the reception of bearing structures 45 which support a suspension idler arrangement, as shown a flexible suspension troughing idler 47, which constitutes a support for the active run 12 of the belt 11 and whose construction need not be herein described in detail, but which is fully disclosed in the application, owned by my assignee, of George Baechli, Serial No. 407,773, filed February 2, 1954, now abandoned. It may be briefly noted that, as fully disclosed in said application, this idler 47 as shown consists of a wire cable to the ends of which there are peened sleeves that are mounted in the bearings of the bearing structures 45, and to the cable and the adjacent ends of the sleeves there is molded and bonded a continuous rubber-like sheath, desirably of neoprene, and consisting of belt supporting rollers and, integral with the latter, comparatively thin, flexible portions which sheath the wire cable where it is not covered by the rollers. This idler 47 is adapted to conform at least substantially to a catenary.

Secured to the inclined portions 43 of the support brackets 41, as by bolt and nut connections 51, are friction type actuating shoes 53 providing, as shown, surfaces 54 adapted to be engaged by the upper run 12 of the conveyor belt 11 when the latter gets off center, and thus to receive drag from the belt and transmit a turning action to the whole structure 17 which will cause a repositioning that will cause the belt to return to proper position. It will be appreciated that the surfaces 54 of each actuating shoe are, as shown, spaced apart, and that the idler 47 lies between them, so that, irrespective of the direction of travel of the active run of the belt, a like relation of the belt to a friction surface 54 may be established as the structure 17 is swung out of perpendicularity to the line of travel of the belt. It would be evident, however, that an operative structure would subsist were there a surface 54 at but one side of the idler at either end of the latter, and that with belt travel in but one direction the operation would be just as satisfactory as with the construction illustrated. The surfaces 54 may be noted to extend obliquely to a plane tangent to the top of the outermost idler rollers and parallel to the line of belt travel, and to be so disposed that they will be contacted by the edge portions of the belt only as the latter moves far enough off center to contact the portion of the surfaces 54 which lie above such plane. It may be noted that with this arrangement the belt needs move but very little out of central position to make the recentering arrangements effective, that the surfaces 54 are so disposed that the belt does not need to move past the outer ends of the end rollers to engage one of the surfaces 54, and that a low and both transversely and vertically compact arrangement is provided.

If the lower run 13 of the conveyor belt moves laterally from centered position it cannot move far enough to contact the brackets 41 as its edge will contact the inward sides of the posts 23 on the base 16. This is true even when the swiveled frame 17 is in its maximum positions of swing.

The swiveled structure will have its range of swiveling limited by engagement, with the members 20, of the sides of the ends of the member 31; and in a desirable arrangement a total range of swing of on the order of 15° will be provided.

It will be noted that the pivot for the swiveled structure supporting of the idler roller 47 lies below the lower run 13 of the conveyor belt, and that the range of swing of the swiveled structure is governed by engagements with the guide members for the lower belt run, and that a very low, compact, and rugged construction is provided without the need for any cross brace frame element extending between the two runs of the belt. This self-aligning idler is reversible, and readily assemblable with others to support an extended length of belt. Moreover, in view of the improved friction actuating shoe arrangement, self-correction of belt displacement takes place very quickly, and a very compact arrangement, particularly laterally, is made possible since the friction shoes normally underlie a belt edge and are alongside the rollers nearest the sides of the pivoted frame.

While there is in this application specifically described one form which the invention may assume in practice, it will be understood that this form of the same is shown for purposes of illustration, and that the invention may be modified and embodied in various other forms without departing from its spirit or the scope of the appended claims.

What is claimed is:

1. In a self-aligning belt idler, a base frame, an idler-supporting frame, means on said base frame for supporting said idler-supporting frame for pivotal movement upon an upright axis, belt-supporting idler means on said supporting frame for the active run of a conveyor belt, and belt-supporting means on said base frame for the return run of the belt, said belt-supporting means on said base frame providing underlying support for the return run of the belt at a level above the top of the means on the base frame for supporting the idler-supporting frame for pivotal movement upon an upright axis and including members having adjacent their opposite ends post-like elements, and said idler-supporting frame having spaced upstanding brackets for supporting idler means for supporting the active run of a belt, said brackets spaced apart a greater distance than the distance apart of said post-like elements.

2. In a self-aligning belt idler, a base plate having extending along it, one at each of the opposite sides of its central longitudinal line, a pair of spaced supporting and guiding elements for the return run of a conveyor belt, a swiveled frame having at its ends supporting brackets for idler roller means for supporting and guiding the active, upper run of a conveyor belt, and means in the space between said spaced supporting and guiding elements and below the level of the tops of the latter providing pivotal support, for turning on an upright axis, of said swiveled frame, said supporting and guiding elements each having thereon at its opposite ends upstanding elements spaced further apart than the width of a belt to be guided but closer to the center line of the return run of the belt when the latter is midway between the ends of said supporting and guiding elements than the closest to such center line that the portions of said supporting brackets nearest to said return run can approach in the maximum swiveled position of said swiveled frame.

3. In a self-aligning belt idler, a base having extending lengthwise thereof at opposite sides of the longitudinal center line thereof and above the bottom thereof members engageable by the lower side of and providing underlying support for the return run of a conveyor belt, and having between said members and below the tops of the latter a vertically swiveled, elongated element carrying at its ends upstanding brackets providing supports for idler roller means for supporting the active run of a conveyor belt.

4. A self-aligning belt idler comprising, a base, an elongated element secured to said base intermediate the length of said element to permit rotational movement thereof in a plane spaced above said base and having longitudinally spaced upwardly extending brackets for supporting means for supporting a run of a conveyor belt therebetween, said base having means extending upwardly therefrom spaced outwardly in opposite directions from said element and from the axis about which said element moves to limit the movement thereof in opposite directions, and said upwardly extending means being spaced with respect to said element so that said brackets are prevented from moving arcuately toward the center of said elongated element beyond a predetermined amount so that a return run of a conveyor belt may pass laterally between said uprights for all positions thereof.

5. A self-aligning belt idler comprising, a base, an elongated element secured to said base intermediate the length of said element to permit rotational movement thereof in a plane spaced above said base and having longitudinally spaced upwardly extending brackets for supporting means for supporting a conveying run of a conveyor belt, said base having means extending upwardly therefrom spaced outwardly in opposite directions from said element and from the axis about which said element moves to limit the movement thereof in opposite directions, said upwardly extending means being adapted to support a return run of a conveyor belt, and said upwardly extending means being spaced with respect to said element so that said brackets are prevented from moving arcuately toward the center of said elongated element beyond a predetermined amount so that a return run of a conveyor belt may pass laterally between said uprights for all positions thereof.

6. A self-aligning belt idler comprising, a base, an elongated element secured to said base intermediate the length of said element to permit rotational movement thereof in a plane spaced above said base and having longitudinally spaced upwardly extending brackets for supporting means for supporting a conveying run of a conveyor belt, and said base having means extending upwardly therefrom in quadrangular spaced relationship to the axis about which said element pivots to limit the pivotable movement of said element in opposite directions, said upwardly extending means being adapted to support a return run of a conveyor belt, and said upwardly extending means being spaced with respect to said element so that said brackets are prevented from moving arcuately toward the center of said elongated element beyond a predetermined amount so that a return run of a conveyor belt may pass laterally between said uprights for all positions thereof.

7. A self-aligning belt idler comprising, a base having a pair of laterally spaced elongated members secured thereto which extend upwardly from said base to be adapted to support a laterally extending return run of a conveyor belt, an elongated element located intermediate the upper edges of said elongated members and said base and extending longitudinally between said members, said element having longitudinally spaced upwardly extending brackets for supporting means for supporting the conveying run of a conveyor belt above such a return run, and means on said base located longitudinally and laterally intermediate said members for supporting said element to permit oscillation of said element between said members.

8. A self-aligning belt idler as claimed in claim 7 having at least one pair of longitudinally spaced belt guide means secured to said members to cooperate with the sides of a return run when the return run is laterally displaced with reference to its length, and said guide means being located to prevent a return run from engaging said brackets.

9. A self-aligning belt idler as claimed in claim 8 wherein the guide means are in the form of vertical posts to which spacing elements can be attached to maintain mutually adjacent base structures properly spaced and connected.

10. A self-aligning belt idler comprising, a base having a pair of laterally spaced elongated members secured thereto which extend upwardly from said base so that the upper surfaces thereof are adapted to support a laterally extending return run of a conveyor belt, an elongated element located intermediate the upper surfaces of said elongated members and said base and extending longitudinally between said members, said element having longitudinally spaced upwardly extending brackets for supporting means for supporting the conveying run of a conveyor belt above such a return run, and means on said base located longitudinally and laterally intermediate said members for supporting said element to permit oscillation of said element between said members.

References Cited in the file of this patent

UNITED STATES PATENTS

| | | |
|---|---|---|
| 857,771 | Thomas | June 25, 1907 |
| 909,833 | Vrooman | Jan. 12, 1909 |
| 1,691,681 | Thomson | Nov. 13, 1928 |
| 2,012,089 | Sayers | Aug. 20, 1935 |
| 2,109,956 | Corbin | Mar. 1, 1938 |
| 2,569,419 | Kendall | Sept. 25, 1951 |
| 2,655,252 | Spurgeon | Oct. 13, 1953 |
| 2,698,077 | Baechli | Dec. 28, 1954 |

FOREIGN PATENTS

| | | |
|---|---|---|
| 26,967 | Australia | May 28, 1931 |
| 623,329 | Great Britain | May 16, 1949 |